Patented Oct. 14, 1947

2,428,923

UNITED STATES PATENT OFFICE 2,428,923

ISOMERIZATION OF HYDRONAPHTHALENES

Charles L. Thomas, Winnetka, and Herman S. Bloch, Chicago, Ill., assignors to Universal Oil Products Company, Chicago, Ill., a corporation of Delaware No Drawing. Application September 21, 1946, Serial No. 698,420

9 Claims. (Cl. 260—666)

This application is a continuation-in-part of our co-pending applications, Serial Nos. 529,682 and 529,683, both filed on April 5, 1944.

This invention relates to the isomerization of tetrahydronaphthalene and decahydronaphthalene and is more specifically concerned with the use of selected catalysts and operating conditions for accomplishing the isomerization reactions.

The hydrocarbon tetrahydronaphthalene or as more commonly termed "tetralin" is ordinarily obtained from hydrocarbon oils or by the hydrogenation of naphthalene produced in coal tar distillation operations. The principal use of tetralin at the present time is as a solvent in varnishes and lacquers. Its physical properties, in particular its high solvent power, makes it very suitable for use in these materials.

Isotetralins such as α methylindane or β-methylindane because of their inherent physical properties are very valuable as solvents in varnishes and lacquers. These isomers have boiling points considerably lower than that of tetralin and because of their increased volatility produce quicker drying varnishes and lacquers than those having the tetrahydronaphthalene incorporated therein.

The hydrocarbon decahydronaphthalene or as more commonly termed "decalin" ordinarily exists in the form of cis-decalin and trans-decalin. These materials are ordinarily obtained from hydrocarbon oils or by the hydrogenation of naphthalene produced in coal tar distillation operations. The principal use of decalin at the present time is as a solvent in varnishes and lacquers. Its physical properties such as its high solvent power and great stability to oxygen make it particularly useful in these types of materials. In fact, because of its great stability to oxygen, it has been found to be advantageous to incorporate a small amount of decalin with turpentine when the latter is used as a solvent to counteract the tendency of the turpentine towards resinification.

Isodecalins formed by the isomerization of either cis or trans decalins have additional physical properties which increase their value as solvents in varnishes and lacquers. The isodecalins because of their increased volatility form quicker drying materials than the materials having the cis or trans decalins incorporated therein. The "dry time" relationship of the isodecalins is considerably less, in some instances, only slightly more than half, than that of the cis and trans decalin. This dry time relationship is defined as the length of time it takes to evaporate a quantity of isodecalin in comparison with the length of time necessary to evaporate a similar quantity of ethyl ether.

No extensive use has been made of these materials as solvents because of the limited supply available and the lack of a simple and efficient method of producing these compounds from more abundant materials.

It is an object of this invention to provide a simple and economical method for converting tetrahydronaphthalene to the more valuable isotetralins such as α or β methylindane, and to convert decahydronaphthalene into "isodecalins" which can be satisfactorily employed as solvents in varnishes and lacquers.

The term "isodecalins" as used hereinafter in this specification and appended claims is intended to mean a hydrocarbon fraction resulting from the conversion of decahydronaphthalene in the presence of selected catalysts hereinafter disclosed and under selected conditions of operation, said fraction being substantially free of aromatics and olefins, having a boiling range of 155 to 185° C. and an index of refraction greater than 1.46, and predominantly composed of bicyclonaphthenes having 10 carbon atoms to the molecule.

A feature of the present invention is the use of catalytic materials which are suitable for directing and accelerating the desired reaction. These catalysts will include associations of the fluorides of aluminum, zirconium, magnesium, thorium and boron. Included within the broad scope of the invention are such catalysts as aluminum fluoride hemihydrate, magnesium fluoride, etc.

In one embodiment the present invention comprises the isomerization of tetralin to isomeric tetralins by subjecting said tetralin under isomerization conditions to the action of a catalyst comprising a compound selected from the group consisting of the fluorides of aluminum, zirconium, magnesium, thorium and boron.

In another embodiment the present invention comprises a process for the conversion of decahydronaphthalene into isodecalins by subjecting said decahydronaphthalene under conversion conditions to the action of a catalyst comprising a compound selected from the group consisting of the fluorides of aluminum, zirconium, magnesium, thorium and boron.

The fluorides of aluminum, zirconium, magnesium, thorium and boron may be purchased in the open market and utilized separately or in any desired combination. The combination catalyst may be prepared by mechanically mixing two or more of the fluorides hereinbefore set forth and, if desired, the mechanical mixture may be composited with a suitable lubricant such as wood rosin, sterotex, etc., and formed into pills of uniform size and shape by pelleting methods. The fluoride catalyst may also be prepared by treating gamma-alumina, aluminum hydroxide or naturally occurring alumina, such as bauxite, with aqueous hydrogen fluoride or with fluosilicic acid. In the latter case the finished catalyst will comprise aluminum fluoride associated with silica.

In another method of manufacturing the catalyst of the present invention, suitable metal salts such as aluminum chloride, aluminum nitrate, etc., either alone or in combination with other metal salts such as magnesium chloride or magnesium nitrate, may be treated with ammonium fluoride to form aluminum fluoride or mixtures of aluminum fluoride and magnesium fluoride. It is understood that the catalyst may comprise either one of the fluorides hereinbefore set forth or various combinations thereof, and also that the catalyst may comprise or contain oxy-fluorides of these metals.

It is not intended that the catalytic materials recited above be considered equivalent in their ability to accelerate the desired reaction in the process of the present invention. The activity of these catalytic materials will be somewhat dependent upon the composition and also upon the method of preparation employed.

The operating conditions such as temperatures, pressures and space velocities which may be satisfactorily employed fall within the following general broad ranges. The particular temperature and pressure selected for any operation will be dependent to a certain extent upon the catalyst being employed and the extent of conversion desired. Temperatures of the order of about 300° C. to about 600° C., pressures below about 100 pounds per square inch, and space velocities in excess of 0.25 measured as volumes of charge liquid per volume of catalyst per hour have been found to give satisfactory results.

In accordance with the present invention, the solid catalyst may be conveniently utilized as filling material in tubes or chambers in the form of small pellets or granules in fixed bed relationship to the incoming reactants or in the finely divided state in a "fluidized" or "compact bed" type of operation.

In the "fluidized" operation, the charge is passed upwardly through a body of finely divided catalysts causing the catalyst particles to be motionalized and forming a fluid-like mass. The catalyst is continuously withdrawn from the reaction zone, regenerated and returned thereto.

In the "moving bed" type of operation, the compact bed may be continuously passed through the reaction zone concurrently or countercurrently to the incoming reactants and passed therefrom into a regeneration zone from which it is returned to the reaction zone after having been regenerated by the combustion of the carbonaceous materials deposited thereon during the conversion reaction.

Another alternative mode of operation comprises suspending the catalyst in a stream of charge and treating said suspension under suitable conditions of temperature and pressure to produce the desired conversion reaction.

After passage of the charge through the catalyst, the products are separated into the desired fractions of isotetralins, lower boiling hydrocarbons and unconverted tetralins, the latter material being recycled to the reaction zone.

The solid catalysts employed in the process of the present invention possess a large total contact surface corresponding to the desirable porosity, the pores of the catalyst particles being of such size and shape that they do not become clogged with carbonaceous deposits after a long period of service and therefore are not difficult to reactivate by oxidation. This structure is also retained after many alternate periods of use and reactivation as evidenced by the fact that the catalyst may be repeatedly reactivated by passing air or other oxidizing gas over the spent particles to burn over deposits of carbonaceous materials at temperatures above 800° F., without apparently affecting the catalyst activity.

We claim as our invention:

1. A process for isomerizing a hydronaphthalene selected from the group consisting of tetrahydronaphthalene and decahydronaphthalene which comprises subjecting said hydronaphthalene at a temperature of from about 300° C. to about 600° C., a pressure below about 100 pounds per square inch, and a liquid hourly space velocity in excess of 0.25 to the action of a catalyst comprising a compound selected from the group consisting of the fluorides of aluminum, zirconium, magnesium, thorium and boron.

2. A process for producing methylindane which comprises subjecting tetralin at a temperature of from about 300° to about 600° C., a pressure below about 100 pounds per square inch, and a liquid hourly space velocity in excess of 0.25 to the action of a catalyst selected from the group consisting of the fluorides of aluminum, zirconium, magnesium, thorium and boron.

3. The process of claim 2 further characterized in that said catalyst comprises aluminum fluoride.

4. The process of claim 2 further characterized in that said catalyst comprises magnesium fluoride.

5. The process of claim 2 further characterized in that said catalyst comprises an association of at least two compounds selected from the group consisting of the fluorides of aluminum, zirconium, magnesium, thorium and boron.

6. A process for producing isodecalins which comprises subjecting decalin at a temperature of from about 300° C. to about 600° C., at a pressure below 100 pounds per square inch, and a liquid hourly space velocity in excess of 0.25 to the action of a catalyst selected from the group consisting of the fluorides of aluminum, zirconium, magnesium, thorium and boron.

7. The process of claim 6 further characterized in that said catalyst comprises aluminum fluoride.

8. The process of claim 6 further characterized in that said catalyst comprises magnesium fluoride.

9. The process of claim 6 further characterized in that said catalyst comprises an association of at least two compounds selected from the group consisting of the fluorides of aluminum, zirconium, magnesium, thorium and boron.

CHARLES L. THOMAS.
HERMAN S. BLOCH.

REFERENCES CITED

The following references are of record in the file of this patent:

UNITED STATES PATENTS

| Number | Name | Date |
|---|---|---|
| 2,296,395 | Michael et al. | Sept. 22, 1942 |

OTHER REFERENCES

Sundgren, Annales des Combustibles Liquides, vol. 5, 57–74, 121–129 (1930). (Patent Office Library.)

Jones, Jour. Chem. Soc., vol. CVII, 1582–8 (1915). (Patent Office Library.)